(12) United States Patent
Jankowski et al.

(10) Patent No.: US 11,611,540 B2
(45) Date of Patent: Mar. 21, 2023

(54) PROTECTION OF AUTHENTICATION DATA OF A SERVER CLUSTER

(71) Applicant: VMware, Inc., Palo Alto, CA (US)

(72) Inventors: Michal A. Jankowski, Sunnyvale, CA (US); Benjamin J. Corrie, Woodinville, WA (US); George Hicken, Palo Alto, CA (US); Christian Lita, Lakeway, TX (US)

(73) Assignee: VMware, Inc., Palo Alto, CA (US)

( * ) Notice: Subject to any disclaimer, the term of this patent is extended or adjusted under 35 U.S.C. 154(b) by 258 days.

(21) Appl. No.: 16/918,760

(22) Filed: Jul. 1, 2020

(65) Prior Publication Data
US 2022/0006792 A1   Jan. 6, 2022

(51) Int. Cl.
| | |
|---|---|
| H04L 29/06 | (2006.01) |
| H04L 29/08 | (2006.01) |
| H04L 15/16 | (2006.01) |
| G06F 15/16 | (2006.01) |
| G06F 9/455 | (2018.01) |
| G06F 9/50 | (2006.01) |
| G06F 21/62 | (2013.01) |
| H04L 9/32 | (2006.01) |
| H04L 9/40 | (2022.01) |
| H04L 67/1097 | (2022.01) |

(52) U.S. Cl.
CPC ...... *H04L 63/0435* (2013.01); *G06F 9/45558* (2013.01); *H04L 63/083* (2013.01); *H04L 67/1097* (2013.01); *G06F 2009/45562* (2013.01); *G06F 2009/45587* (2013.01); *G06F 2009/45595* (2013.01)

(58) Field of Classification Search
CPC .............. H04L 63/0435; H04L 63/083; H04L 67/1097; H04L 63/0428; H04L 67/10; G06F 9/45558; G06F 2009/45562; G06F 2009/45587; G06F 2009/45595
USPC ........................................................ 713/171
See application file for complete search history.

(56) References Cited

U.S. PATENT DOCUMENTS

| | | | | |
|---|---|---|---|---|
| 8,060,703 | B1 * | 11/2011 | Desai ................. | G06F 9/45558 711/E12.07 |
| 9,292,376 | B2 * | 3/2016 | Ren ....................... | G06F 11/301 |
| 9,584,517 | B1 * | 2/2017 | Roth ..................... | G06F 21/602 |

(Continued)

FOREIGN PATENT DOCUMENTS

| | | | | |
|---|---|---|---|---|
| EP | 3447667 B1 * | 10/2020 | ............ | G06F 21/34 |
| WO | WO-2005022821 A1 * | 3/2005 | ........ | H04L 63/0428 |
| WO | WO-2020198539 A1 * | 10/2020 | ........ | G06F 9/45516 |

*Primary Examiner* — David R Lazaro
*Assistant Examiner* — Berhanu Shitayewoldetadik
(74) *Attorney, Agent, or Firm* — Dentons US LLP

(57) ABSTRACT

This disclosure describes a process for securely instantiating a virtual machine on a server cluster. The virtual machine just after instantiation has access to persistent storage that includes an encrypted region and lacks access to an encryption key configured to provide access to data stored within the encrypted region. The virtual machine receives a communication from a management server associated with the server cluster that includes the encryption key configured to provide access to the data stored within the encrypted region. After the virtual machine receives the encryption key, the server cluster runs services that depend upon the data stored within the encrypted region to operate after receiving the communication from the management server.

20 Claims, 6 Drawing Sheets

(56) References Cited

U.S. PATENT DOCUMENTS

| | | | |
|---|---|---|---|
| 9,864,874 B1* | 1/2018 | Shanbhag | H04L 63/10 |
| 9,954,680 B1* | 4/2018 | Machani | H04L 9/0825 |
| 10,223,538 B1* | 3/2019 | Cignetti | G06F 21/53 |
| 10,348,693 B2* | 7/2019 | Auradkar | H04L 63/0428 |
| 10,402,578 B2* | 9/2019 | Roth | H04L 9/088 |
| 10,491,568 B1* | 11/2019 | Roth | H04L 9/0894 |
| 10,521,360 B1* | 12/2019 | Gibson | G06F 12/1466 |
| 10,521,566 B2* | 12/2019 | Choi | H04L 63/10 |
| 10,684,888 B1* | 6/2020 | Sethuramalingam | G06F 9/45558 |
| 10,691,619 B1* | 6/2020 | Gibson | G06F 3/067 |
| 10,841,089 B2* | 11/2020 | Neerumalla | H04L 9/0861 |
| 11,057,496 B2* | 7/2021 | Jambure | G06F 9/445 |
| 11,340,797 B2* | 5/2022 | Murray | H04L 9/0631 |
| 11,343,247 B1* | 5/2022 | Ozarkar | H04L 67/56 |
| 11,344,504 B1* | 5/2022 | Frederick | A61P 35/00 |
| 11,347,868 B2* | 5/2022 | Araya | H04L 9/0841 |
| 2005/0081066 A1* | 4/2005 | Lahdensivu | H04L 9/3226 726/19 |
| 2005/0278525 A1* | 12/2005 | Douceur | H04L 9/0894 713/153 |
| 2007/0113078 A1* | 5/2007 | Witt | G06F 21/602 713/165 |
| 2007/0180449 A1* | 8/2007 | Croft | H04L 67/141 718/1 |
| 2007/0192329 A1* | 8/2007 | Croft | G06F 3/1415 |
| 2008/0256645 A1* | 10/2008 | Choi | H04L 63/0428 380/44 |
| 2008/0320316 A1* | 12/2008 | Waldspurger | H04L 63/083 713/189 |
| 2009/0282266 A1* | 11/2009 | Fries | G06F 21/602 713/193 |
| 2010/0086134 A1* | 4/2010 | Ureche | G06F 21/80 380/277 |
| 2011/0107331 A1* | 5/2011 | Evans | H04W 4/60 718/1 |
| 2011/0154023 A1* | 6/2011 | Smith | H04L 9/321 713/168 |
| 2011/0202765 A1* | 8/2011 | McGrane | G06F 21/80 713/168 |
| 2011/0276806 A1* | 11/2011 | Casper | G06F 21/78 713/189 |
| 2012/0066460 A1* | 3/2012 | Bihani | G06F 15/17318 711/E12.001 |
| 2012/0173882 A1* | 7/2012 | Horn | G06F 21/78 713/189 |
| 2013/0145477 A1* | 6/2013 | Matsushima | G06F 21/125 726/26 |
| 2014/0059379 A1* | 2/2014 | Ren | G06F 11/1484 714/15 |
| 2014/0108786 A1* | 4/2014 | Kreft | G06Q 20/3825 713/194 |
| 2014/0283010 A1* | 9/2014 | Rutkowski | H04L 63/0428 726/18 |
| 2014/0331060 A1* | 11/2014 | Hayton | G06F 21/32 713/185 |
| 2014/0344420 A1* | 11/2014 | Rjeili | G06Q 10/109 709/227 |
| 2015/0128233 A1* | 5/2015 | Nechytaylo | H04W 12/12 726/6 |
| 2015/0150125 A1* | 5/2015 | Dulkin | H04L 63/1433 726/22 |
| 2016/0127336 A1* | 5/2016 | Cignetti | G06F 9/4812 713/171 |
| 2016/0277368 A1* | 9/2016 | Narayanaswamy | G06F 21/6209 |
| 2016/0306815 A1* | 10/2016 | Hertz | H04L 67/06 |
| 2016/0344582 A1* | 11/2016 | Shivanna | H04L 41/04 |
| 2017/0061128 A1* | 3/2017 | Novak | G06F 21/575 |
| 2017/0061138 A1* | 3/2017 | Lambert | H04L 63/18 |
| 2017/0169233 A1* | 6/2017 | Hsu | G06F 16/215 |
| 2018/0069844 A1* | 3/2018 | Cignetti | H04L 63/0876 |
| 2018/0150646 A1* | 5/2018 | Roth | H04L 63/20 |
| 2018/0167204 A1* | 6/2018 | Wall | G06F 21/602 |
| 2018/0255090 A1* | 9/2018 | Kozloski | H04L 67/535 |
| 2018/0337991 A1* | 11/2018 | Kumar | H04L 41/0897 |
| 2019/0044708 A1* | 2/2019 | Dewan | H04L 9/0897 |
| 2019/0068561 A1* | 2/2019 | Caragea | H04L 9/3263 |
| 2019/0102568 A1* | 4/2019 | Hausauer | H04L 63/06 |
| 2019/0171379 A1* | 6/2019 | Van Riel | G06F 3/0643 |
| 2019/0196731 A1* | 6/2019 | Sapuntzakis | G06F 3/062 |
| 2019/0229908 A1* | 7/2019 | Peddada | G06F 21/602 |
| 2019/0318102 A1* | 10/2019 | Araya | H04L 9/0891 |
| 2019/0340136 A1* | 11/2019 | Irwin | G06F 21/602 |
| 2019/0349346 A1* | 11/2019 | Curtis | H04W 12/084 |
| 2019/0349347 A1* | 11/2019 | Curtis | H04L 63/0876 |
| 2020/0034245 A1* | 1/2020 | Kohler | G06F 11/1458 |
| 2020/0073826 A1* | 3/2020 | Tsirkin | G06F 9/30101 |
| 2020/0073829 A1* | 3/2020 | Tsirkin | G06F 13/102 |
| 2020/0133791 A1* | 4/2020 | Liu | G06F 16/13 |
| 2020/0241906 A1* | 7/2020 | Tsirkin | G06F 9/5061 |
| 2020/0310845 A1* | 10/2020 | Liguori | G06F 9/54 |
| 2020/0310850 A1* | 10/2020 | Liguori | G06F 11/1438 |
| 2021/0034791 A1* | 2/2021 | Singh | G06F 21/6218 |
| 2021/0049260 A1* | 2/2021 | Misaizu | H04L 63/123 |
| 2022/0006620 A1* | 1/2022 | Bursell | G06F 21/606 |
| 2022/0006787 A1* | 1/2022 | Bursell | H04L 9/0897 |

* cited by examiner

PROTECTION OF AUTHENTICATION DATA OF A SERVER CLUSTER

FIELD

The present disclosure relates generally to keeping encryption keys stored as plain text from being saved to persistent storage of accessible server cluster systems.

BACKGROUND

Server clusters often host a large number of diverse users making network security important. Server clusters that incorporate Kubernetes clusters and container constructs can include an even larger number of users. Oftentimes individual hosts and/or virtual machines of the server cluster require elevated access to a management server in order to perform tasks needed to ensure smooth operation of the server cluster. For this reason, security of authentication data such as the encryption keys used by the hosts to access the management server is important. For at least this reason ways of improving security of the encryption keys is desirable.

SUMMARY

This disclosure describes mechanisms for protecting authentication data used by a server cluster.

A computer implemented method is described and includes the following: instantiating a virtual machine on a server cluster, wherein the virtual machine has access to persistent storage that includes an encrypted region and wherein the virtual machine lacks access to an encryption key configured to provide access to data stored within the encrypted region; receiving a communication at the server cluster from a management server associated with the server cluster that includes the encryption key configured to provide access to the encrypted region of the persistent storage; storing the encryption key received from the management server in non-persistent storage accessible by the virtual machine; decrypting the data stored within the encrypted region using the encryption key; and running services that depend upon the data stored within the encrypted region to operate after decrypting the stored data.

A non-transitory computer-readable storage medium that stores instructions configured to be executed by one or more processors of a computing device is disclosed. The non-transitory computer-readable storage medium when executed by the one or more processors cause the computing device to carry out steps that include: instantiating a virtual machine on the server cluster, wherein the virtual machine has access to persistent storage that includes an encrypted region and wherein the virtual machine lacks access to an encryption key configured to provide access to authentication data stored within the encrypted region; receiving a communication from a management server associated with the server cluster that includes the encryption key configured to provide access to the encrypted region of the persistent storage; and running services that depend upon the authentication data stored within the encrypted region to operate after receiving the communication from the management server.

A server cluster is disclosed and includes one or more processors; persistent storage, comprising an encrypted region; non-persistent storage; and memory storing one or more programs configured to be executed by the one or more processors, the one or more programs including instructions for: instantiating a virtual machine on the server cluster, wherein the virtual machine has access to the persistent storage and lacks access to an encryption key configured to provide access to data stored within the encrypted region; receiving a communication at the server cluster from a management server associated with the server cluster that includes the encryption key configured to provide access to the encrypted region of the persistent storage; storing the encryption key received from the management server in the non-persistent storage, which is accessible by the virtual machine; decrypting the data stored within the encrypted region; and running services that utilize the data stored within the encrypted region to operate after decrypting the stored data.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Certain details are set forth below to provide a sufficient understanding of various embodiments of the invention. However, it will be clear to one skilled in the art that embodiments of the invention may be practiced without one or more of these particular details. Moreover, the particular embodiments of the present invention described herein are provided by way of example and should not be used to limit the scope of the invention to these particular embodiments. In other instances, hardware components, network architectures, and/or software operations have not been shown in detail in order to avoid unnecessarily obscuring the invention.

Server clusters running under a management server such as VMWare vCenter® often need privileged access to the management server to perform tasks such as creating virtual machines (VMs), disks and other resources. Unfortunately, storing authentication data such as the passwords and/or encryption keys needed to access the management server and other potentially sensitive systems of the server cluster in an unencrypted region of the persistent storage can result in a user with access to the persistent storage gaining unauthorized access to the passwords and/or encryption keys, thereby allowing the user to gain unauthorized and elevated privilege on the server cluster.

One solution to this issue is to configure rules that prevent VMs and other virtual constructs of a server cluster from writing encryption keys and passwords to persistent storage in an unencrypted state. In order to successfully implement this type of rule, the VMs of the server cluster should still be able to gain access to at least one encryption key in order to access authentication data providing access to the various resources and services they need to conduct normal operations. The encryption key granting access to the encrypted areas on the server cluster can be provided by the management server. The management server is configured to monitor the server clusters and when it detects startup of a master virtual machine (VM) it sends the encryption key to the master VM where it gets stored in non-persistent storage, thereby allowing the master VM to gain access to encrypted authentication data stored on persistent storage. Master VM will also be configured to delay operations requiring access to the encrypted authentication data until it receives the encryption key from the management server, thereby avoiding unnecessary errors resulting from a lack of encryption keys or passwords.

These and other embodiments are discussed below with reference to FIGS. 1-4; however, those skilled in the art will readily appreciate that the detailed description given herein with respect to these figures is for explanatory purposes only and should not be construed as limiting.

Figure 1:
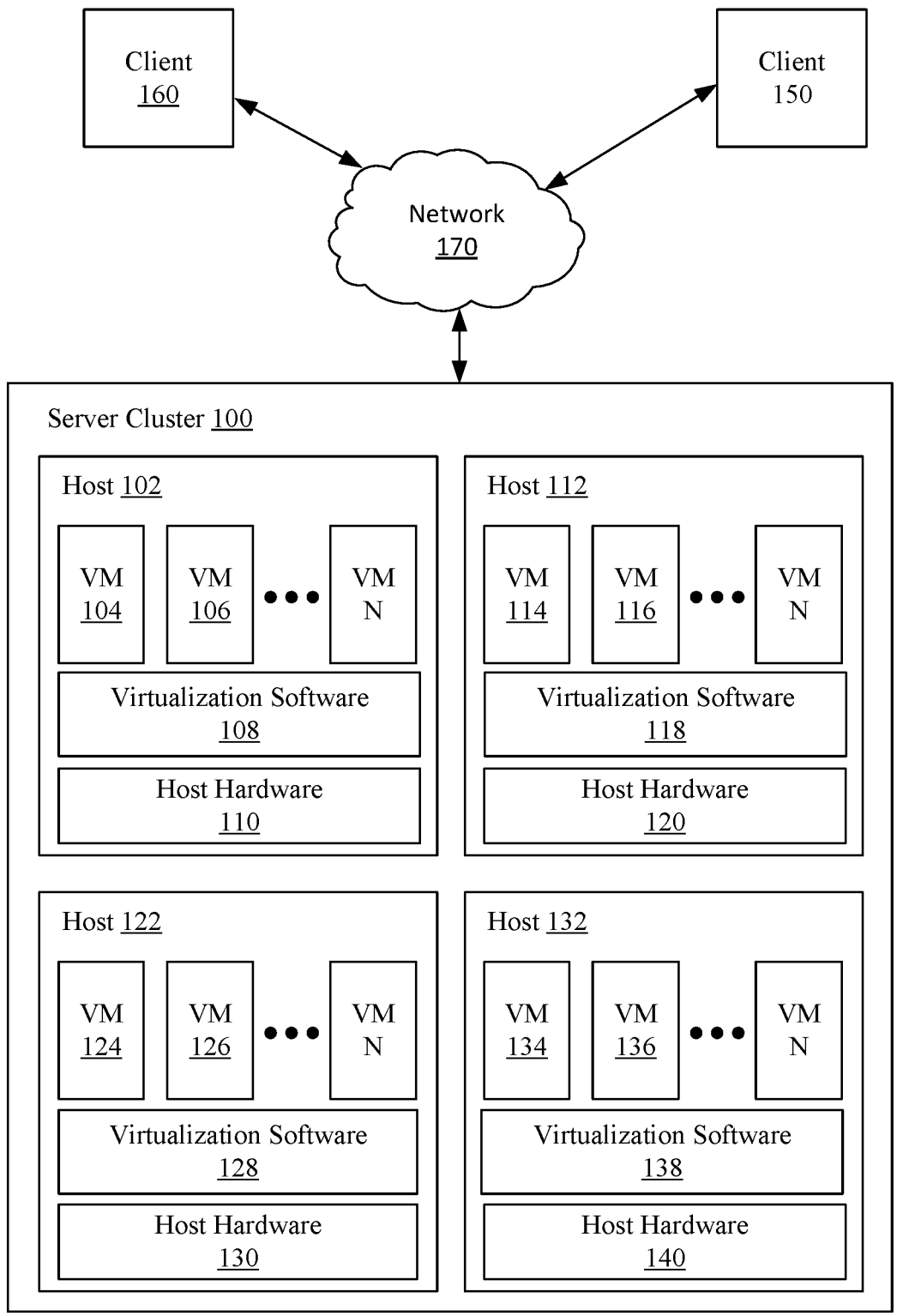
FIG. 1 shows a diagram illustrating an exemplary server cluster suitable for use with the embodiment described herein.

FIG. 1 shows a block diagram illustrating an exemplary server cluster 100 suitable for use with the embodiment described in this disclosure. Server cluster 100 can include hosts 102, 112, 122 and 132. While a four host system is shown for exemplary purposes it should be appreciated that server cluster 100 could include a larger or smaller number of hosts. Each host 102-132 includes host hardware 110-140, which can include a designated amount of processing, memory, network and/or storage resources. In some embodiments, each of the hosts provide the same amount of resources, and in other embodiments, the hosts are configured to provide different amounts of resources to support one or more virtual machines (VMs) running on the hosts. Each of the VMs can be configured to run a guest operating system that allows for multiple applications or services to run within the VM.

Each of hosts 102, 112, 122 and 132 are capable of running virtualization software 108, 118, 128 and 138, respectively. The virtualization software can run within a virtual machine (VM) and includes management tools for starting, stopping and managing various virtual machines running on the host. For example, host 102 can be configured to stop or suspend operations of virtual machines 104 or 106 utilizing virtualization software 108. Virtualization software 108, commonly referred to as a hypervisor, can also be configured to start new virtual machines or change the amount of processing or memory resources from host hardware 110 that are assigned to one or more VMs running on host 102. Host hardware 110 includes one or more processors, memory, storage resources, I/O ports and the like that are configured to support operation of VMs running on host 102. In some embodiments, a greater amount of processing, memory or storage resources of host hardware 110 is allocated to operation of VM 104 than to VM 106. This may be desirable when, e.g., VM 104 is running a larger number of services or running on a more resource intensive operating system than VM 106. Clients 140 and 150 are positioned outside server cluster 100 and can request access to services running on server cluster 100 via network 160. Responding to the request for access and interacting with clients 140 and 150 can involve interaction with a single service or in other cases may involve multiple smaller services cooperatively interacting to provide information requested by clients 140 and/or 150.

Hosts 102, 112, 122 and 132, which make up server cluster 100, can also include or have access to a storage area network (SAN) that can be shared by multiple hosts. The SAN is configured to provide storage resources as known in the art. In some embodiments, the SAN can be used to store log data generated during operation of server cluster 100. While description is made herein with respect to the operation of the hosts 110-140, it will be appreciated that those of hosts 110-140 provide analogous functionality, respectively.

Figure 2:
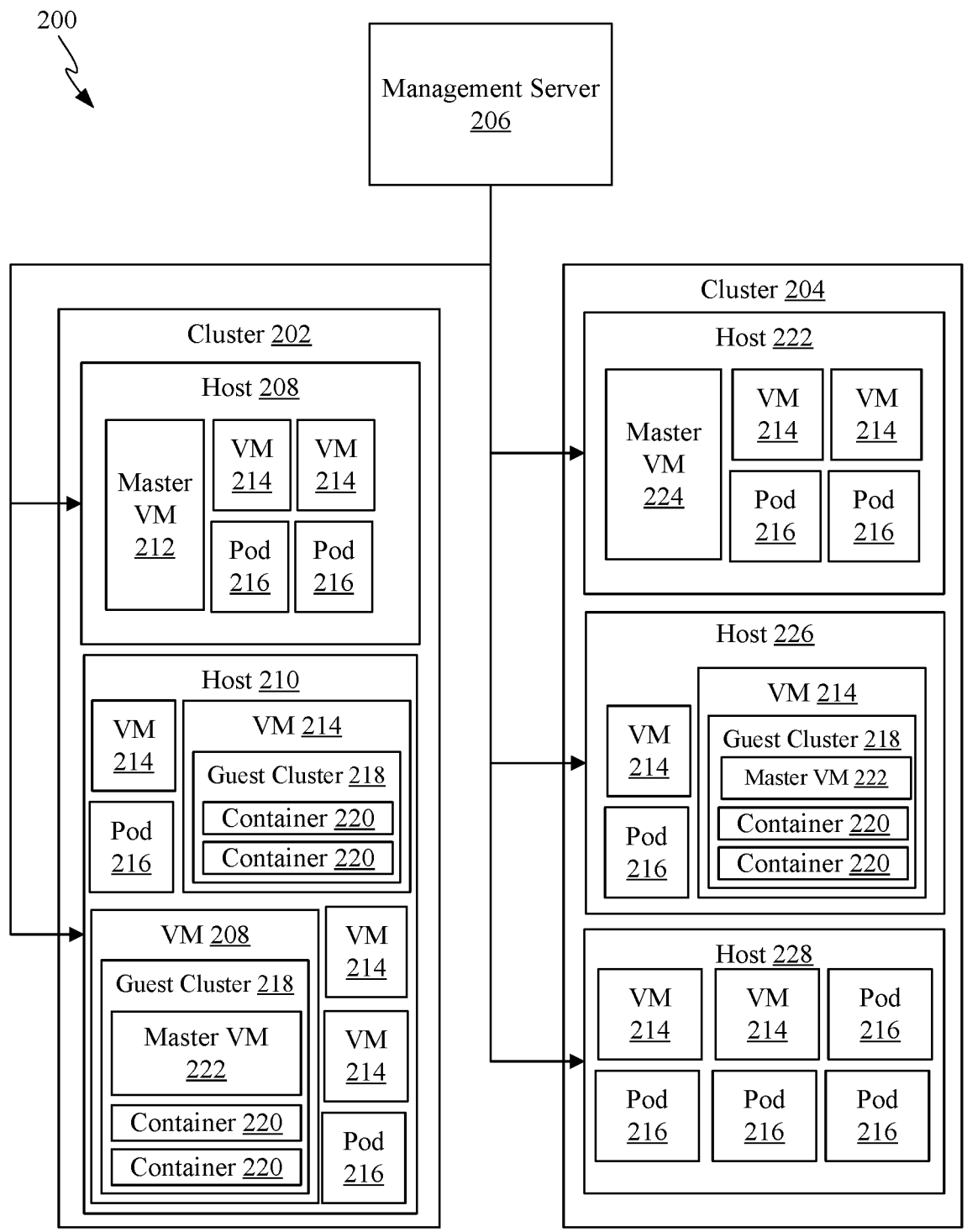
FIG. 2 shows another exemplary computing environment that includes multiple server clusters in communication with a management server.

FIG. 2 shows another exemplary computing environment 200 that includes multiple server clusters 202 and 204 in communication with a management server 206. In some embodiments, server clusters 202 and 204 can take the form of supervisor clusters that use virtual machines (VMs) to implement both control plane nodes and compute objects managed by the Kubernetes® control plane. For example, Kubernetes® pods are implemented as "pod VMs," each of which includes a kernel and container engine that supports execution of containers. The Kubernetes® control plane of the supervisor cluster is extended to support VM objects in addition to pods, where the VM objects are implemented using native VMs (as opposed to pod VMs). In some embodiments, management server 206 can take the form of a VMWare vCenter® Server that is able to communicate and perform administrative tasks to keep each of the cluster and hosts within their respective clusters functioning properly. In some embodiments, each of clusters 202 and 204 can include virtualization components and various hardware similar to those described in cluster 100 depicted in FIG. 1; however, for purposes of focus and clarity some of those components have been omitted from FIG. 2. Cluster 202 includes at least hosts 208 and 210, however, it should be appreciated that many more hosts could be included in each of the depicted clusters. In particular, host 208 can include virtualization software that facilitates the creation of a master virtual machine (VM) 212. Master VM 212 can operate on a modified Kubernetes framework that allows it to govern and administer over a number of VMs, Pods and native Kubernetes clusters running contained within a VM. It should be noted that the master VM does not have to run on a Kubernetes framework and that this is merely one implementation example. Master VM 212 will include an authentication module allowing for the secure authentication of some users and particularly administrators. In some embodiments, these authentication components can include tools for interacting with and receiving login credentials taking many forms. For example, login credentials can be received from any of the following: (1) a reader capable of transmitting credentials stored on an identification badge, security card or electronic device; (2) one or more biometric readers configured to scan and transmit one or more identifying features of a user by analyzing a user's retina, finger prints and/or voice; and (3) a user input device configured to allow the user to enter a username and password. Some services can require a user to submit multiple forms of authentication from one or more of the aforementioned categories.

Host 208 can run different types of virtual constructs that include VMs 214 and pods 216. Pods 216 can run natively on virtualization software associated with hosts 208 and 210 of cluster 202. Multiple containers can be instantiated and run within each of pods 216. Other virtual construct options include running a Kubernetes cluster taking the form of a guest cluster 218 within one of VMs 214. Guest clusters include a master VM 222, a standard Kubernetes® control plane and associated nodes, as well as components for interfacing the underlying supervisor cluster. The guest cluster executes within compute objects managed by the supervisor cluster (e.g., native VMs or both native VMs and pod VMs) and utilizes networking and storage exposed by the supervisor cluster. In this manner, a guest cluster is a virtual extension of an underlying management cluster (i.e., the supervisor cluster). Guest cluster 218 allows a service administrator to instantiate a desired number of containers 220 to support the service. In some embodiments, each of VMs 214, pods 216 and guest clusters 218 can be configured with different security rules that allow users different levels of access to content hosted on the same host and/or server. To support this type of functionality users are often required to provide credentials when initially accessing a different service. In some embodiments, a service running on one VM or container may be able to auto-scale across different hosts or clusters to give a user access to another VM or container running the same service without requiring the user to provide a new set of login credentials.

Figure 3A:
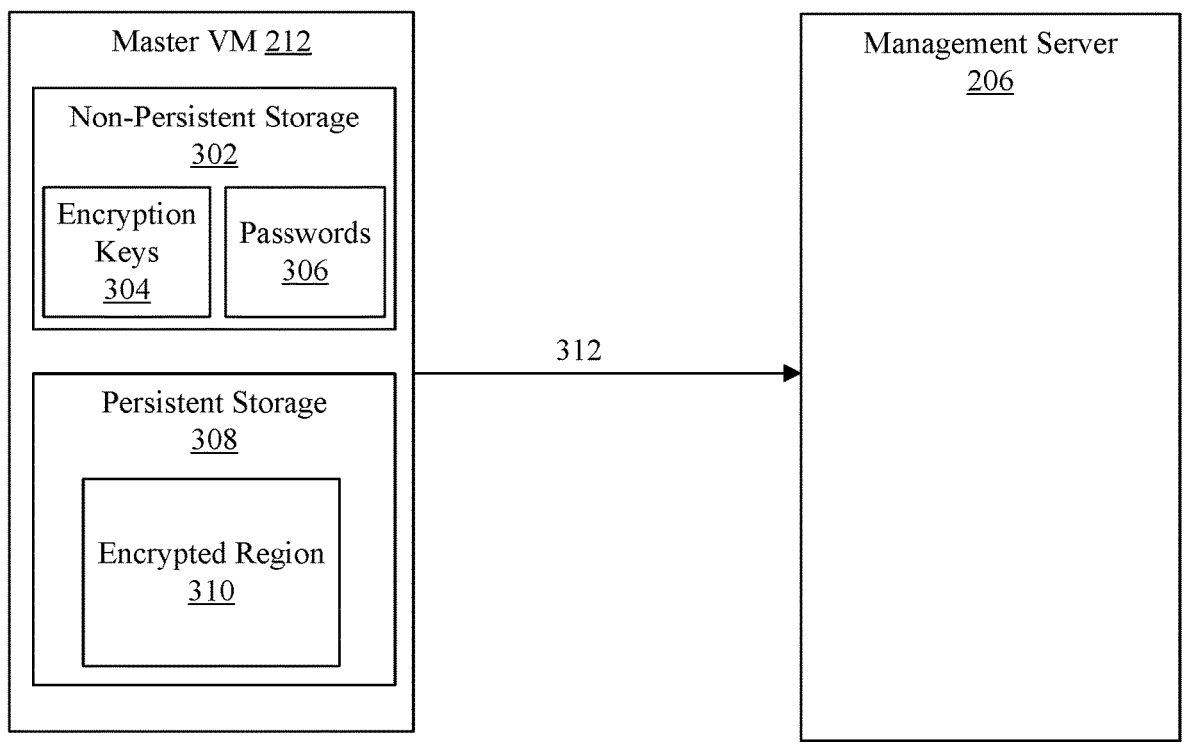
FIGS. 3A-3C shows a series of states of a master virtual machine and a management server in accordance with the described embodiments.
Figure 3B:
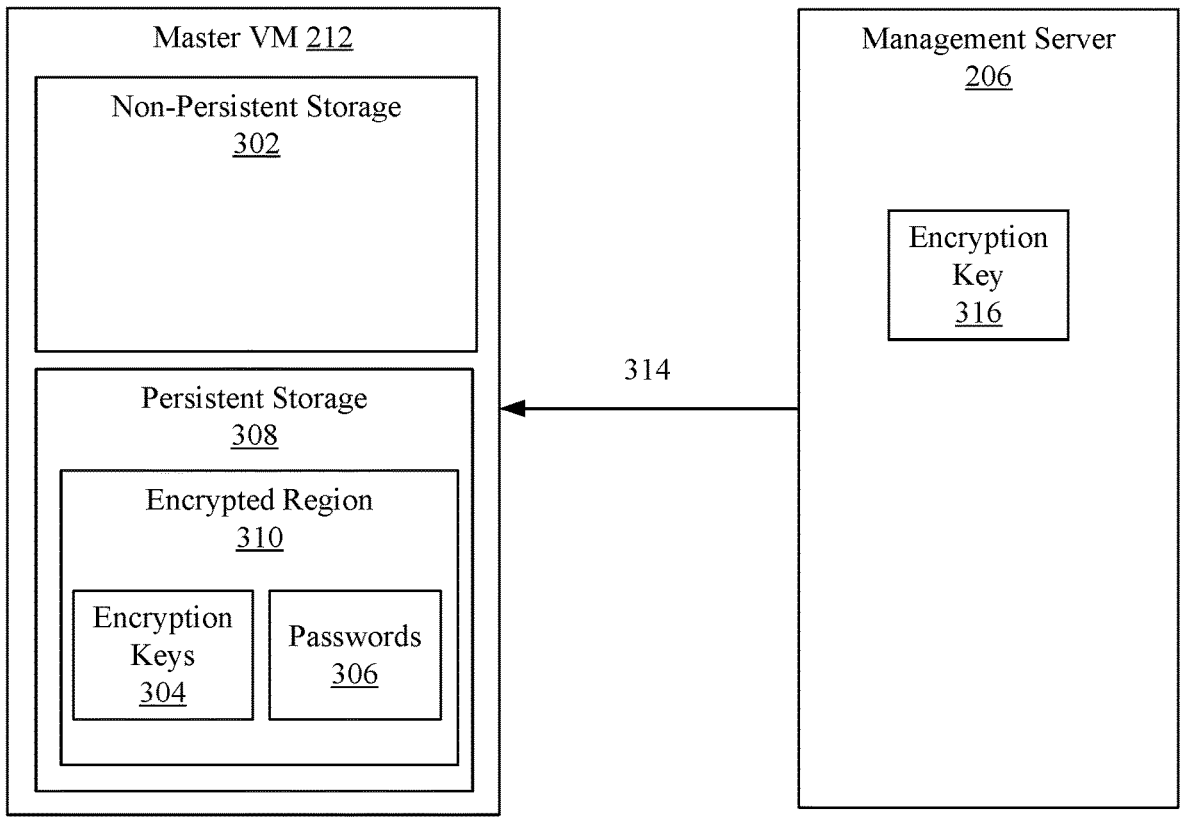
Figure 3C:
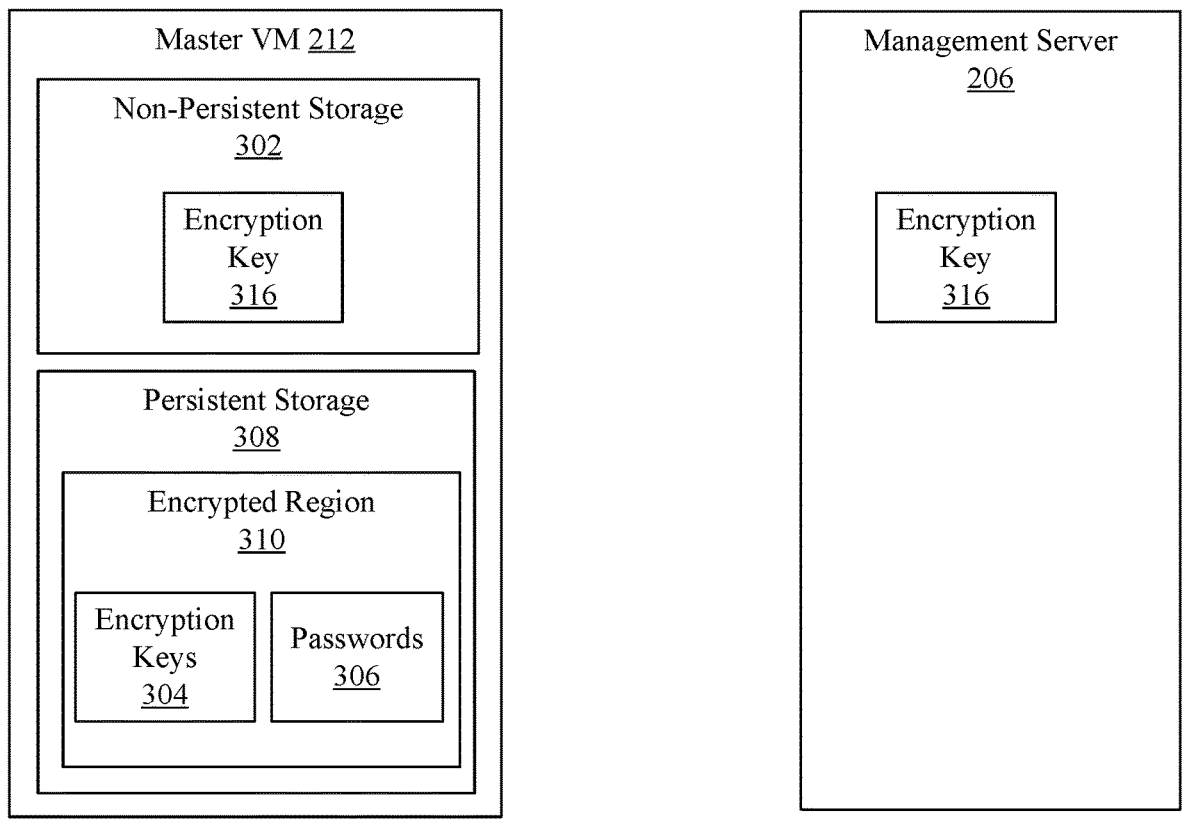

FIGS. 3A-3C shows a series of states of a master VM and a management server in accordance with the described embodiments. FIG. 3A shows a first state of master VM 212 prior to shut down. This can occur where a host or server cluster upon which the master VM is running needs to shut down or reboot for applying updates and/or performing maintenance. As depicted, master VM 212 can include a non-persistent storage 302 where multiple encryption keys 304 and passwords 306 are saved. In some embodiments, non-persistent storage 302 can take the form of a portion of the physical RAM of host 208 allocated to master VM 212. Master VM 212 also has access to persistent storage 308, which can take the form of an allocated portion of a physical storage device of host 208 or a storage area network (SAN) that is shared by multiple hosts or clusters of exemplary computing environment 200. A portion of persistent storage 308 can be encrypted with one of encryption keys 304, preventing unauthorized access to authentication data or other sensitive data stored within.

Prior to shutdown, master VM 212 can optionally send a communication 312 to management server 206 informing management server 206 of an imminent shutdown. This communication 312 can also be part of a standard synchronization transmission carried out between the host upon which master VM 212 runs and management server 206. In some embodiments, communication 312 can include an estimated time of its next scheduled instantiation. Communication 312 can also include a copy of the encryption key needed to access encrypted region 310 of persistent storage 308 for safe keeping. Prior to shutdown master VM 212 can also save any updates to encryption keys 304 and passwords 306 within encrypted region 310 of persistent storage 308, which may contain older versions of the encryption keys and/or passwords. In some embodiments, transmission of the encryption key associated with encryption region 310 to management server 206 can be unnecessary where management server 206 is responsible for issuing and updating the encryption keys for encrypted region 310 of persistent storage 308. In some embodiments, each master VM running in a cluster can use the same encryption key on account of persistent storage 308 being shared across the server cluster.

FIG. 3B shows master VM 212 in a second state after master VM 212 has been shut down. Non-persistent storage 302 associated with VM 212 is purged on shutdown of master VM 212, leaving only encrypted region 310 of persistent storage 308 with current versions of encryption keys 304 and passwords 306. Management server 206 monitors a state of master VM 212 as part of a synchronization process between management server 206 and the host upon which master VM 212 runs that includes reports of any new VM instantiations, allowing management server 206 to determine when master VM 212 has been instantiated. In some embodiments, a frequency with which management server 206 synchronizes with the various hosts making up the server cluster to check on the status of master VM 212 can increase after a threshold period of time or around the time master VM 212 informed management server 206 it estimated being instantiated again. In some embodiments, this synchronization process can be part of a regular process that always runs on the server at a fixed interval of between 10 and 30 seconds. Once master VM 212 is instantiated it includes no encryption keys to communicate securely with management server 206 or any other devices or services since all its encryption keys 304 and passwords 306 are stored within encrypted region 310 of persistent storage 308 and the encryption key needed to access encrypted region 310 of persistent storage 308 is also unavailable. To prevent the generation of unnecessary errors, a service running within VM 212 can be configured to interrupt the execution of services dependent on authentication data stored within encrypted region 310 by master VM 212 until management server 206 initiates a transmission 314 over a secure channel that includes an encryption key 316 to master VM 212. The encryption key is configured to provide access to encrypted region 310 of persistent storage 308.

It should be noted that while encryption key is depicted as being transmitted directly to master VM 212, encryption key 316 can be initially received by the virtualization software responsible for managing VMs on host 208, sometimes referred to as a hypervisor, which can then be responsible for delivering encryption key 316 to master VM 212. In some embodiments, the transmission 314 can include instructions for the virtualization software regarding timing of when encryption key 316 should be delivered to master VM 212. For example, delivery of encryption key 316 can be delayed until master VM 212 is ready to initiate guest operations.

FIG. 3C shows master VM 212 in a third state after encryption key 316 has been transmitted back to instantiated master VM 212. Once encryption key 316 is received and stored in non-persistent storage 302, master VM 212 can access and retrieve encryption keys 304 and passwords 306 from encrypted region 310 of persistent storage 308. In this way, master VM 212 can return to normal operation without ever placing unencrypted authentication data onto persistent storage 308. Management server 206 can retain encryption key 316 in storage in the event master VM 212 suffers an unexpected crash and needs to regain access to encrypted region 310 of persistent storage 308. In embodiments where encrypted region 310 is shared across a number of different master VMs, management server 206 can be responsible for periodically updating encryption key 316 in order to improve security.

Figure 4:
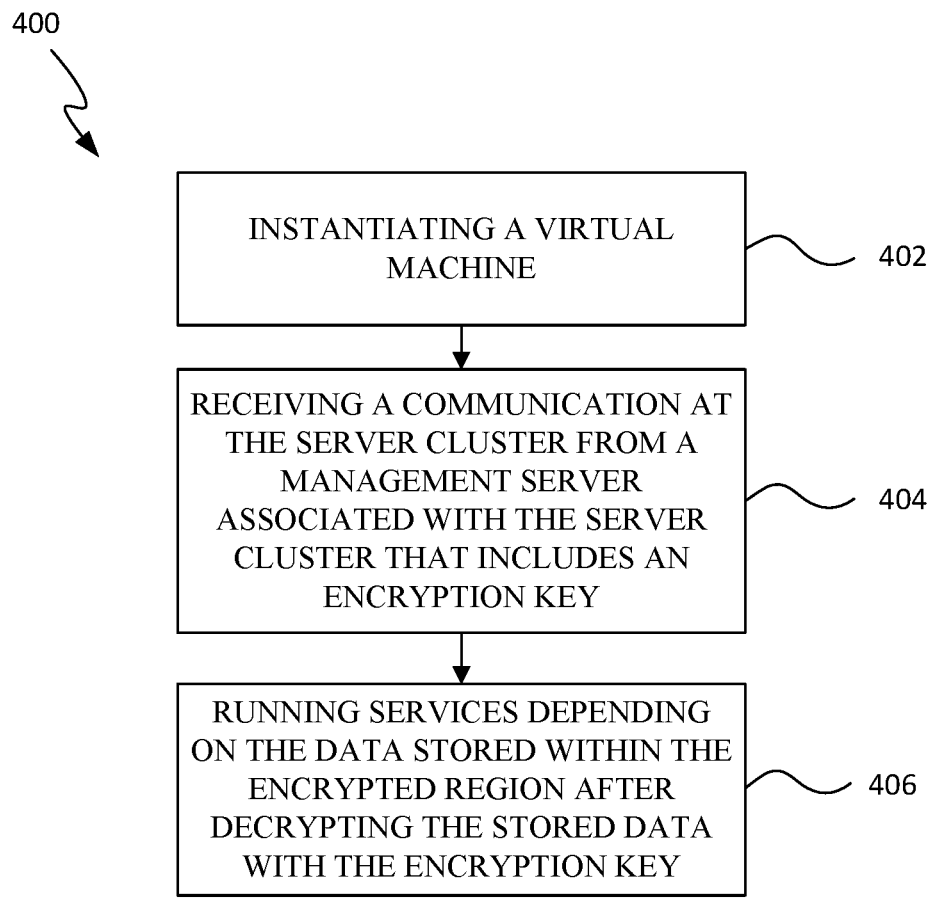
FIG. 4 shows a flow diagram illustrating a process for securely providing a newly instantiated virtual machine access to authentication data that includes passwords and encryption keys.

FIG. 4 shows a flow diagram 400 illustrating a process for securely providing access to authentication data that includes passwords and encryption keys to a newly instantiated virtual machine. The process can be performed by a server cluster in communication with a management server. At 402, a virtual machine is instantiated on a server cluster. The virtual machine can be a master VM, which is configured to run with elevated privileges that allow it to assist in the administration of various virtual constructs such as other VMs, Pods and guest clusters running on the cluster. However, in order to keep the server cluster secure, persistent storage, which the newly instantiated VM has access to, does not contain any encryption keys to provide the VM the access it needs to perform the tasks for which it is responsible. Authentication data including passwords and encryption keys capable of giving the VM the access it needs are stored on an encrypted portion of the persistent storage that is inaccessible to the VM without a private encryption key. At 404, a management server paired and in communication with the server cluster upon which the virtual machine is instantiated can be configured to repeatedly synchronize with the server cluster. During the synchronization the server cluster can report any changes made to the management server. These changes can include the instantiation of VMs, pods and guest clusters and the termination of the same. After receiving a report of the VM instantiated at 402, a communication is received from the management server that includes an encryption key for providing access to the encrypted region of the persistent storage to the VM. In some embodiments, the communication can include timing instructions requesting virtualization software managing operation of the server cluster delay delivery of the encryption key until the VM reaches a predetermined state of readiness. For example, the encryption key can be delivered only after the VM is ready to conduct guest operations. At 406, once the VM is given access to the encryption key and uses the encryption key to decrypt the authentication data stored within the encrypted region of the persistent storage, the VM can be configured to begin running services on the server cluster that depend on the authentication data.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computer implemented method performed on a server cluster, comprising:
   instantiating a virtual machine on the server cluster, wherein the virtual machine has access to persistent storage that includes an encrypted region and wherein the virtual machine lacks access to an encryption key configured to provide access to authentication data stored within the encrypted region;
   receiving a communication at the server cluster from a management server associated with the server cluster that includes the encryption key configured to provide access to the encrypted region of the persistent storage;
   storing the encryption key received from the management server in non-persistent storage accessible by the virtual machine;
   decrypting the authentication data stored within the encrypted region using the encryption key; and
   running a plurality of different services using the authentication data stored within the encrypted region to operate after decrypting the authentication data, wherein the authentication data is separate and distinct from the encryption key.

2. The computer implemented method as recited in claim 1, wherein the communication received from the management server is delivered to the virtual machine by virtualization software running on a host associated with the virtual machine.

3. The computer implemented method as recited in claim 2, wherein the communication received from the management server directs the virtualization software to delay delivery of the encryption key to the virtual machine until the virtual machine reaches a predetermined state in which it is ready to initiate guest operations.

4. The computer implemented method as recited in claim 1, further comprising:
   elevating privileges of the virtual machine on the server cluster using the authentication data,
   wherein running the plurality of different services comprises administering a plurality of virtual constructs comprising a plurality of virtual machines.

5. The computer implemented method as recited in claim 1, wherein all data stored on the persistent storage is within the encrypted region.

6. The computer implemented method as recited in claim 1, wherein the authentication data stored on the encrypted region of the persistent storage comprises encryption keys and passwords.

7. The computer implemented method as recited in claim 1, wherein the encryption key is never written to the persistent storage of the server cluster in an unencrypted state.

8. The computer implemented method as recited in claim 1, further comprising shutting down the virtual machine without saving the encryption key to persistent storage.

9. A non-transitory computer-readable storage medium storing instructions configured to be executed by one or more processors of a server cluster cause the server cluster to carry out steps that include:
   instantiating a virtual machine on the server cluster, wherein the virtual machine has access to persistent storage that includes an encrypted region and wherein the virtual machine lacks access to an encryption key configured to provide access to authentication data stored within the encrypted region;
   obtaining a communication from a management server associated with the server cluster that includes the encryption key configured to provide access to the encrypted region of the persistent storage; and
   running a plurality of different services using the authentication data stored within the encrypted region to operate after decrypting the authentication data, wherein the authentication data is separate and distinct from the encryption key.

10. The non-transitory computer-readable storage medium as recited in claim 9, wherein the steps carried about by the server cluster further comprise:
    storing the encryption key received from the management server in non-persistent storage accessible by the virtual machine; and
    decrypting the data stored within the encrypted region.

11. The non-transitory computer-readable storage medium as recited in claim 9, wherein the server cluster includes virtualization software configured to deliver the encryption key to the virtual machine.

12. The non-transitory computer-readable storage medium as recited in claim 9, wherein the encryption key is never written to the persistent storage of the server cluster in an unencrypted state.

13. The non-transitory computer-readable storage medium as recited in claim 9, wherein the data stored on the persistent storage comprises encryption keys and passwords associated with one or more services configured to run on the server cluster.

14. The non-transitory computer-readable storage medium as recited in claim 9, wherein the steps carried about by the server cluster further comprise shutting down the virtual machine without saving the encryption key to persistent storage.

15. A server cluster, comprising:
one or more processors;
persistent storage, comprising an encrypted region;
non-persistent storage; and
memory storing one or more programs configured to be executed by the one or more processors, the one or more programs including instructions for:
instantiating a virtual machine on the server cluster, wherein the virtual machine has access to the persistent storage and lacks access to an encryption key configured to provide access to authentication data stored within the encrypted region;
receiving a communication at the server cluster from a management server associated with the server cluster that includes the encryption key configured to provide access to the encrypted region of the persistent storage;
storing the encryption key received from the management server in the non-persistent storage, which is accessible by the virtual machine;
decrypting the authentication data stored within the encrypted region; and
running a plurality of different services that utilize the authentication data stored within the encrypted region to operate after decrypting the stored authentication data,
wherein the stored authentication data is separate and distinct from the encryption key.

16. The server cluster as recited in claim 15, wherein the authentication data stored on the encrypted region of the persistent storage comprises encryption keys and passwords associated with the plurality of different services.

17. The server cluster as recited in claim 15, wherein the authentication data stored on the encrypted region of the persistent storage comprises an encryption key facilitating secure two-way communication between the virtual machine and the management server.

18. The server cluster as recited in claim 15, wherein the virtual machine is a master virtual machine and the server cluster comprises a plurality of master virtual machines.

19. The server cluster as recited in claim 15, wherein the encryption key is never written to the persistent storage in an unencrypted state.

20. The server cluster as recited in claim 15, wherein receiving the communication from the management server comprises delivering the communication to the virtual machine by virtualization software running on the server cluster.

* * * * *